March 17, 1964  L. ROSENVOLD  3,125,170
DETACHABLY MOUNTED CULTIVATOR TOOTH APPARATUS
Filed April 17, 1961  2 Sheets-Sheet 1

INVENTOR
Leo Rosenvold
BY Robert E. Klene
ATTORNEY

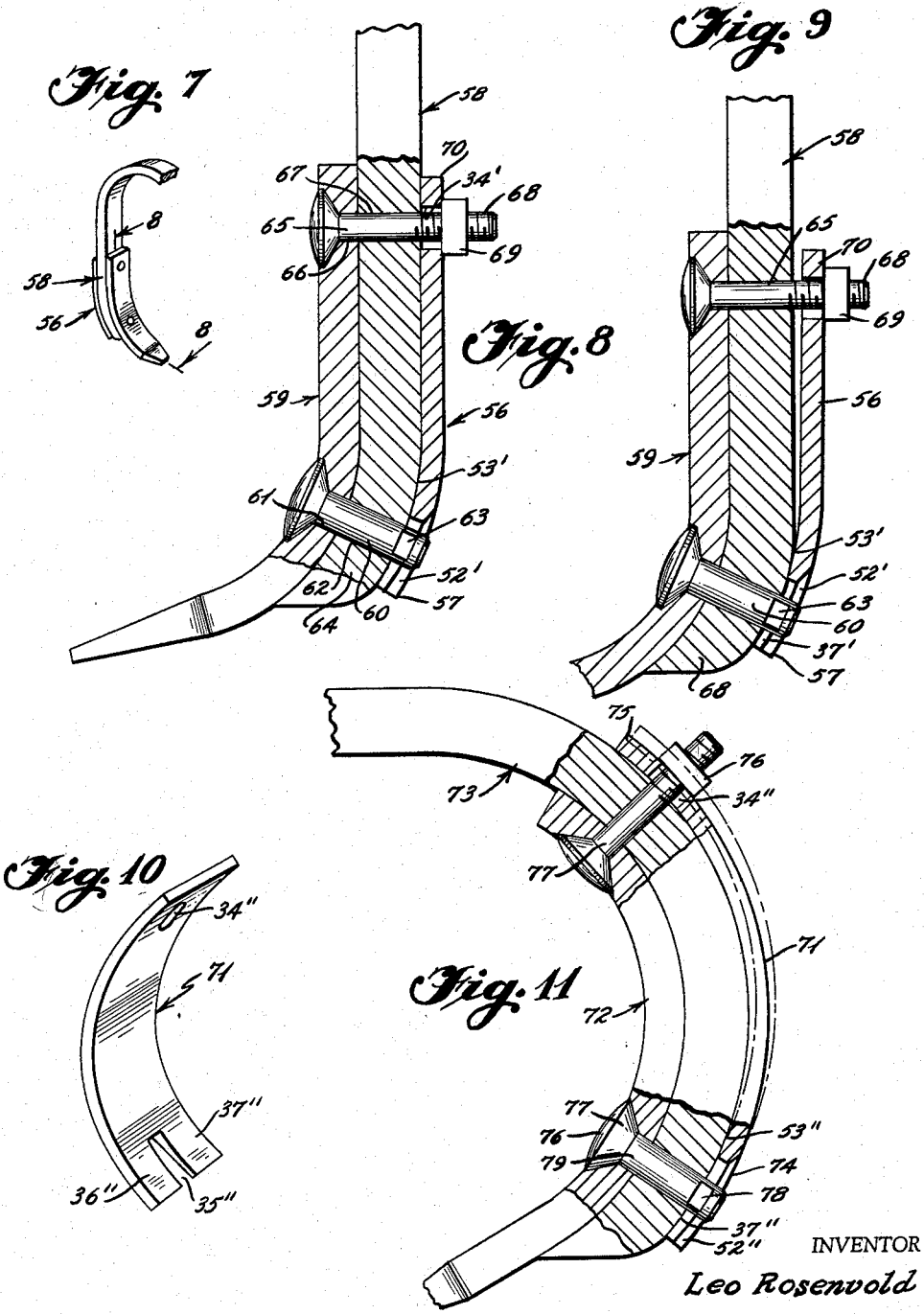

United States Patent Office 3,125,170
Patented Mar. 17, 1964

1

3,125,170
DETACHABLY MOUNTED CULTIVATOR
TOOTH APPARATUS
Leo Rosenvold, Wildrose, N. Dak.
Filed Apr. 17, 1961, Ser. No. 103,279
7 Claims. (Cl. 172—762)

This invention relates to tillage and cultivation equipment, more particularly to detachably mounted cultivator teeth apparatus.

Generally speaking, a conventional cultivator is provided with a large number of cultivator teeth and each cultivator tooth is, normally, individually mounted to the cultivator. Consequently the overall task of attaching all the teeth may consume a sizable amount of time, depending upon the type of attachment employed for the mounting of the tooth.

Various attachment devices have been suggested and employed in the past for this purpose, however none of these have proved entirely satisfactory. Many of the prior devices for this purpose, for example, have required several nut tightening operations for each tooth, others have required the need of locking washers to secure the nut members in place. It accordingly followed that each additional nut and washer and other element in being attached consumed an additional amount of time, and when the additional time required for attaching each tooth was multiplied by the total number of teeth in the cultivator, the resulting total additional time expended to perform the entire operation of attaching all the teeth became substantial. Also, certain of these devices did not provide sufficient long lasting sturdy adtachment, and in various other respects were less than satisfactory.

It is an object of the invention to overcome the deficiencies of these previous devices and mechanisms and to provide a novel, improved, and simplified method and apparatus for rapidly mounting as well as removing cultivator teeth to or from the shank of a cultivator.

It is a further object of the invention to provide a novel improved detachable cultivator tooth apparatus whereby each individual tooth may be rapidly and simply attached and which provides a sturdy connection, and also which provides an automatic spring lock washer action to prevent the retaining nut or tightening means from falling off.

It is another object of the invention to provide an improved method and apparatus for detachably mounting a cultivator tooth, which when assembled can be retained in its assembled condition, by means of a single threaded tightening means.

Further objects and advantages of the invention will become apparent as the description proceeds and when taken in conjunction with the accompanying drawings wherein:

FIG. 7 is a perspective view of the first modified form of mounting plate in operative attachment to a cultivator tooth and shank of the more curved type or character.

FIG. 8 is a cross-sectional view taken along line 8—8 of FIG. 7.

FIG. 9 is a side elevational view of the first modified mounting plate before the plate has been tightened against the shank.

FIG. 10 is a perspective view of a second modified form of mounting plate, having a moon-like curvature.

FIG. 11 is a side elevational view of the second modified form of mounting plate, mounted to a cultivator shank of a similar conformation.

Briefly stated, the invention is an apparatus for detachably mounting cultivator teeth to the shank of a cultivator, which utilizes an elongated plate having an aperture adjacent the upper end and a slot adjacent the lower end, for receiving a pair of bolts extending through the cultivator tooth and cultivator shank to the plate, with one of the bolts having opposed grooves for reception in the elongated slot of the plate, and the bolt being secured to the plate by means of a nut, and with the cultivator shank being curved with respect to the plate, so as to provide a fulcrum for tightening the lower slotted end of the plate against the grooved bolt, when the nut upon the upper bolt is tightened.

Figure 1:
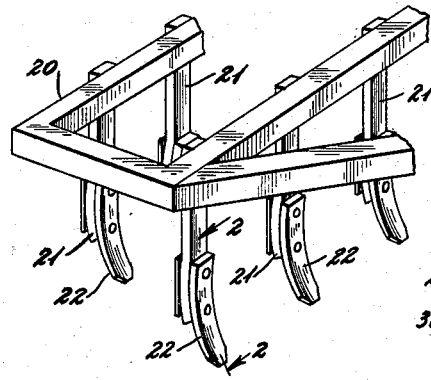
FIG. 1 is a perspective view of the cultivator tooth invention mounted to the shank members of a cultivator.

With further reference to the drawings, in FIG. 1, a plurality of the detachably mounted apparatus for attaching cultivator teeth are shown mounted to a conventional cultivator, in a perspective view. The cultivator frame 20 of the cultivator is provided with a plurality of shanks 21, which depend downwardly therefrom. At the lower end of the depending shanks 21, are the cultivator teeth 22 detachably mounted to the shanks.

Figure 2:
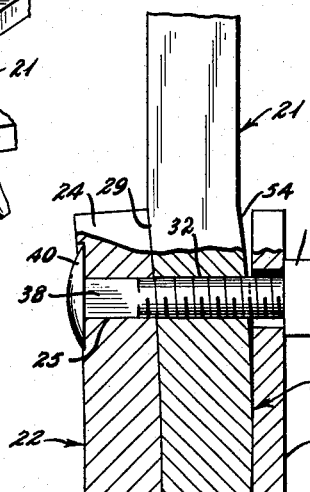
FIG. 2 is an enlarged detailed side elevational view of the detachably mounted cultivator tooth apparatus or mechanism, taken along line 2—2 of FIG. 1, with portions cut-away to reveal the interior thereof.

In FIG. 2 the details of a cultivator tooth and its detachably mounting apparatus are illustrated in an enlarged side elevational view. In this figure, the elongated cultivator tooth 22 has a tapered point 23, at its lower end, and a square blunt upper end 24. A pair of cylindrical apertures 25 and 25′ are provided at spaced parallel intervals in the tooth, which apertures extend laterally of the length of the tooth, from the front face 27, through to the rear face 28 of the tooth.

The cultivator tooth 22 is mounted with its convex back face 28 in flush contact with the convex front face 29 of the shank 21, and with the lower end or tapered point 23 of the tooth projecting downward beyond the lower end 30 of the shank 21.

The shank 21 is provided with a convex rear face 31, and also includes a pair of spaced parallel apertures 32 and 32′, which are in concentric alignment with the tooth apertures 25 and 25′.

An elongated mounting plate 33 is disposed upon the rear convex face 31 of the shank and rests in tangential contacting relation upon the curved convex surface 31. The mounting plate 33 is provided with a cylindrical aperture 34 disposed centrally at the upper end of the plate, and which is in generally concentric alignment with the upper cylindrical apertures 25 and 32 of the tooth and shank respectively. The plate aperture 34 is slightly oversized with respect to the apertures 25 and 32. The mounting plate also includes an elongated slot 35, which extends upward centrally from the lower end of the plate to form bifurcated fork members 36 and 37.

A pair of bolts 38 and 39 extend through the upper and lower apertures of the teeth and shank, with the upper bolt 38 projecting into the aperture 34 of the mounting plate, and extending slightly beyond, and with the lower bolt projecting perpendicularly into the elongated slot 35, and also slightly therebeyond. The upper bolt 38 has a flared enlarged head member 40, which abuts the front face 27 of the tooth 22. At the other end of the bolt 38 is a threaded nose portion 41, which is threadably received by a rectangular nut 42. The lower bolt or rivet 39 is slightly shorter in length than the upper bolt, and has a similarly enlarged head portion 43 integral to and adjacent the front of the bolt, and which also abuts the front face of the tooth. The lower bolt or rivet 39 is provided with a pair of opposed parallel grooves 44 and 45, adjacent the nose end 46 of the bolt. The opposed grooves 44 and 45 form channels which run transversely of the axis of the bolt, along a chord-like path, with each groove in the bolt having parallel inner side walls 47 and 48, upper and lower shoulders 49 and 50.

The mounting plate 33 is also provided with tapered shallow depressions 51 and 52 which extend along the inner edges of the bifurcated fork portions 36 and 37, at the lower end of the plate immediately adjacent the slot. The tapered portions 51 and 52 are inclined downwardly toward the slot and also are inclined downwardly toward the lowermost edge of the plate 33.

The cultivator shank 21, in having a curved convex rear face, tangentially contacts the flat mounting plate centrally of the length of the mounting plate at a fulcrum location 53, with the upper end 54 and the lower end 55 of the cultivator shank curving away from the plate to provide space therebetween.

The tapered point 23 of the tooth 22 provides the initial engagement with the ground, during the cultivating operation.

*Method of Mounting the Cultivator Tooth to the Shank*

Figure 3:
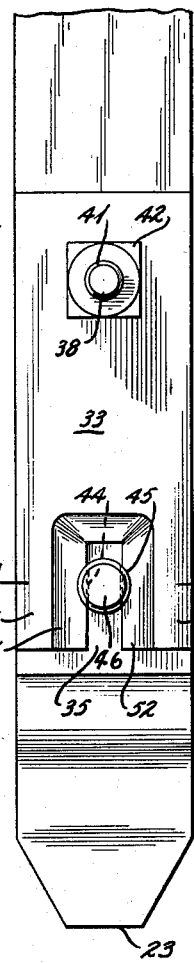
FIG. 3 is a rear elevational view of the detachably mounted cultivator invention.
Figure 5:
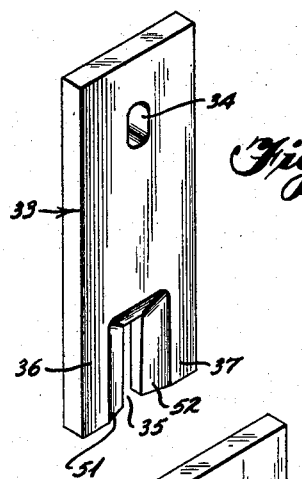
FIG. 5 is a perspective view of the straight type of mounting plate.

In order to mount the cultivator tooth to the shank, the tooth 22 is placed flush with the shank, in the manner indicated, for example, in FIGURES 2 and 3.

Whereupon the slotted bolt 39 is inserted into the lower aperture 32' of the shank until the nose end 46 of the bolt 39 projects beyond the shank in the manner illustrated for example in FIGURE 2. The bolt 39 is then rotated to a position where the bolt grooves 44 and 45 are aligned parallel to the length of the plate and shank.

Whereupon the elongated mounting plate 33 is placed upon the rear face of the shank, parallel in length with the shank, and with the bifurcated fork members 36 and 37 projecting downward toward the grooved bolt 39.

The plate 33 is then slid downward, lower end first, toward the grooved bolt 39 with the bifurcated fork members 36 and 37 at the lower end of the plate, laterally engaging and straddling the bolt and being snugly received into the opposed grooved portions of the bolt, as illustrated in FIG. 2. The plate 33 is slid downward until the bifurcated forks have been fully received into the grooves of the bolt, and the upper aperture 34 of the mounting plate is positioned in generally concentric alignment with the upper aperture 32 of the shank and the upper aperture 25 of the tooth. The plate aperture 34 is made slightly oversized to facilitate this alignment.

The upper bolt 38 is then inserted into the upper aperture 25 of the tooth and the upper apertures 32 and 25 of the shank and plate, respectively, from the front face of the tooth, until the threaded end 41 of the bolt 38 projects beyond the plate 33 in the manner indicated in FIG. 3. The threaded nut 42 is then rotated onto the cooperating threaded end 41 of the bolt and is tightened against the plate.

The tightening of the threaded nut 42 against the plate 33 draws the upper end 24 of the tooth against the front face of the shank and the plate 33 toward the rear face of the shank. Because of the curved convex rear face of the shank, the tightening of the nut 42 will pivot the plate 33 upon the fulcrum 53 formed by the curvature of the shank, and move the lower bifurcated end of the plate outward.

The outward movement of the bifurcated lower end of the plate causes the tapered edges 51 and 52 of the bifurcated forks to engage the upper shoulders 49 of the bolt grooves 44 and 45, which draws the slotted bolt 39 outward, with the outward movement of the bolt causing the head portion 43 of the bolt to engage against the lower front face portion of the tooth and press the tooth against the shank, and thereby firmly tighten the lower ends of the shank and tooth together.

The attachment of the cultivator tooth is now completed. This operation will be repeated for each additional cultivator tooth which is being mounted to the cultivator.

Since both the upper and lower end of the cultivator tooth can be tightened against the shank by means of the single nut 42, the cutltivator tooth may be properly mounted with a minimum expenditure of time.

Nevertheless, by virtue of the plate straddling the lower bolt and the fulcrum action of the plate, the cultivator tooth will be held firmly in position, as the tightening of the single nut 42 acts to tighten both the upper and lower ends of the tooth against the shank.

The mounting plate 33 is manufactured of steel, and is provided with a certain amount of resilience, which allows the upper and lower ends of the plate to flex inwardly during the tightening operation. The flexing of the ends of the plate provides a spring locking action for the nut 42 at the upper end of the plate, since the nut 42, in tightening and urging or flexing the plate inwardly, places the plate under tension so as to constantly press against the nut 42, and its frictional engagement tends to prevent the nut from rotating, thereby reducing the likelihood of the nut rotating loose or coming off during the cultivating operation.

Also the tapered recessed portions 51 and 52 adjacent the slot facilitate the sliding engagement of the plate with the grooved bolt, and act to cam the grooved bolt outward.

The opposed parallel grooves 44 and 45 in the lower bolt, when the place 33 has been inserted, prevent the bolt from rotating while the bolt is mounted to the tooth and shank.

The slotted bolt 39 may be modified, however, by providing an annular groove in lieu of the opposed parallel grooves. With the annular grooves the bolt 39 need not be rotated until the grooves are in alignment to receive the slotted plate.

*Cultivator Mounting Plate With Curved Lower End Portion*

Figure 6:
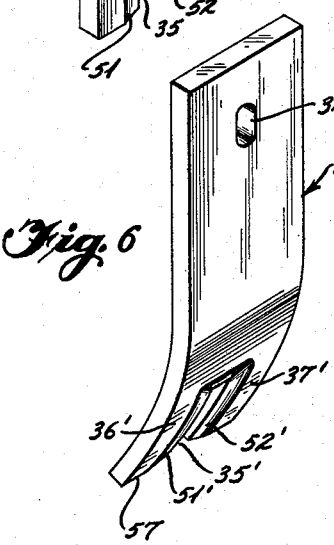
FIG. 6 is a perspective view of a first modified form of mounting plate, having a curved lower end portion.
Figure 4:
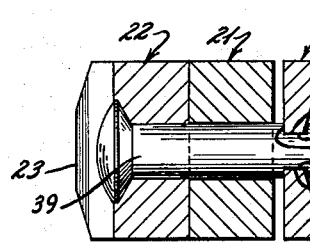
FIG. 4 is a cross-sectional view of the invention, taken along line 4—4 of FIG. 3.

The invention includes several modified forms of mounting plate apparatus. The first modified form is the mounting plate 56, illustrated in perspective in FIG. 6. The plate 56 is provided with a curved lower end portion 57, and is intended to be employed for attachment of cultivator teeth and shanks having a sharply curved or L-shaped conformation, such as illustrated in FIGS. 7, 8 and 9.

The modified mounting plate 56 is mounted to the L-shaped shank portion 58 in the same manner as the straight mounting plate 33. First, the sharply curved cultivator tooth 59, is placed flush against the shank 58, as illustrated in FIG. 8. A counter-sunk rivet 60 is then fully inserted into the lower apertures 61 and 62 of the tooth and shank respectively. The opposed grooves 63, at the outer end of the counter-sunk rivet 60 serve the same function as the opposed grooves 44 and 45 of the bolt 39, for the straight mounting plate 33.

The modified mounting plate 56 is provided with bifurcated fork members 36' and 37', at the lower end portion 57, which form a slot 35' after the counter-sunk rivet has been inserted and the grooves aligned parallel with the length of the tooth and shank, the bifurcated forks at the lower curved end of the mounting plate 56 are inserted downwardly into the grooves of the rivet until the plate 56 is firmly wedged in the position illustrated in FIG. 8, with respect to the shank.

The lower curved end 57 of the mounting plate will rest flush with the lower end 64 of the shank, since the lower end of the plate has the same curvature as the shank, at that portion. However, the lower end of the mounting plate only rests flush up to the fulcrum point or location 53'. Thereafter, the plate, as pre-formed, diverges outward and upward from the fulcrum 53' and shank.

After the lower end of the plate 56 has been inserted and wedged into position, an upper bolt 65 is inserted into the apertures 66 and 67 of the tooth and shank respectively. The remote end 68 of the bolt also passes through an elongated aperture or slot 34', at the upper end of the mounting plate. This elongated aperture 34' serves the same function as the elongated aperture 34 of the flat mounting plate 33.

Thereafter a nut 69 is threaded onto the upper bolt until it reaches the position illustrated in FIG. 8. FIGURE 9 illustrates the normal curvature of the plate 56, as preformed, and before the nut 69, has been tightened against the plate 56.

When the nut 69 is tightened against the plate 56, the nut forces or flexes the upper end of the plate 70 toward the shank, until at the upper end 70, rests flush against the shank as illustrated in FIG. 8, with the nut 69, holding it in this position.

Inward urging of the upper end of the plate 70, causes a leverage reaction about the fulcrum location 53', causing the lower slotted end of the plate to be urged outwardly against the outer shoulders of the counter-sunk rivet 60. This outward urging of the lower end of the plate by a tightening of the nut causes the tooth, shank, and plate assembly at the lower end, adjacent the rivet, to be tightened together. Also, the tightening of the nut simultaneously causes the upper end of the assembly to be tightened together.

The nut 69 need not necessarily tighten the plate flush against the shank, as this will depend upon the thickness and resilience of the mounting plate 56 employed. If the metal plate 56 is thicker the nut 69 need only tighten the plate a lesser distance toward the shank, into order to create a sufficient outward urging of the lower end of the plate, to create an adequate tightening of the assembly, and to cause a spring lock action of the upper nut.

It is however an important feature of the leverage and fulcruming action that, initially, before the tightening that the plate assume position, whereby the upper end of the plate is spaced from the shank, so that the fulcruming tightening action can readily take place.

*Arcuate Shaped Mounting Plate*

For conventional cultivator teeth and shanks which have a pronounced, but uniformly gradiated curvature throughout their entire length, a third modified form of invention is provided. The third modified form is the arcuately shaped mounting plate 71, illustrated in FIG. 10, in perspective, and it discloses the plate as being curved throughout its length with an elongated aperture 34" at its upper end, and bifurcated fork members 36" and 37", forming a slot 35" at the lower end.

The arcuately shaped mounting plate is shown mounted to the arcuately shaped tooth 72, and shank 73 in FIG. 11, and is shown in its unflexed or before tightening position in dashed lines, and after tightening is shown in solid lines.

The lower end 74 of the mounting plate is curved to follow the curvature of the shank, and the plate is pre-bent outward slightly at fulcrum location 53", to provide the fulcruming or levering action of the plate.

By virtue of the sharp bend outward, the upper end 75 of the plate diverges outwardly away from the shank, in its normal position. However, the curvature of the upper end 75 of the plate conforms substantially with the curvature of the shank, so that when the plate is tightened from its dashed position, by the threading of a nut 76, further on to the upper bolt 77, the plate will be urged toward the shank, until the plate rests substantially flush with the shank, as illustrated in solid lines in FIG. 11.

The plate is mounted or wedged into the opposed grooves 78 of the counter-sunk rivet 79, in the same manner, as the modified mounting plate just described.

Also in both the first and second modified forms of mounting plates the tapered portions 51', 52', and 51" and 52", are tapered inward toward one another, and are tapered downward toward the lower ends of their respective plates, in the same manner as the tapered portions 51 and 52, of the straight mounting plate 33, to facilitate the wedging insertion of the forked ends into the grooves of the lower rivet or bolt.

Also, the slotted counter-sunk rivets 60 and 79, and the slotted bolt or rivet 39, are provided with straight cylindrical rod-like portions, with spherical head portions, and with tapered interior head portions.

Thus it may be seen that the invention provides a novel, rapid and simplified apparatus and method to detachably mount cultivator teeth, and that such features as the wedging, levering and tightening operation of the invention may be employed with cultivator teeth of various curvatures and shapes. It should be understood, however, that the invention may be readily modified for mounting cultivator teeth to shanks which teeth and shanks have curvatures or configurations other than those specifically described.

Also it should be readily understood that various other changes or modifications may be made to the invention without departing from the spirit and scope thereof, and that accordingly the invention is not limited to that which is described in the specification and set forth in the drawing, but only as indicated in the appended claims.

What is claimed is:

1. A detachably mounted cultivator tooth apparatus comprising an elongated tooth, an elongated shank having its upper end connected to the frame of a cultivator, said tooth and said shank being positioned in offset relation to one another with said shank having a front face and with said tooth adjacent said front face, the tooth and shank each having a pair of longitudinal spaced apertures, the shank and tooth apertures being in axial alignment with one another, a pair of elongated bolts passing into the tooth apertures and on through the shank apertures, the bolts having heads which abut the exterior face of the tooth adjacent the edge of the tooth apertures, a flat generally upright plate having upper and lower ends, said shank having a curved rearward face abutting the central portion of said plate, said curved rearward face having its upper and lower portions curving away from said upper and lower ends of said plate, said plate having an aperture at its upper end for receiving the end of one of said bolts passed through the tooth and shank, said one bolt being threaded along its end portion, a threaded nut for threading onto the end of the bolt and engaging the exterior face of the plate and acting to clamp the tooth and shank and plate together, said plate having a slot extending upwardly from the lowermost edge of the plate, said other bolt having a pair of opposed grooves extending laterally of the length of the bolt, said plate slot acting to be slidably received in the grooves of the bolt, said plate being substantially straight whereby when the nut upon the upper one bolt is tightening the plate will pivot and flex centrally upon the fulcrum formed by the curved shank abutting relation with said plate so that the slot in the lower end of the plate will be forced against the outer edges of the bolt grooves and cause the lower end of the tooth to be tightened against the shank while the upper end of the tooth is also being tightened against the shank.

2. A cultivator tooth apparatus comprising an elongated shank for connection with the frame of a cultivator, a cultivator tooth positioned at the lower end of said shank, said tooth being substantially flush with the forward face of the shank, said tooth and shank each having spaced upper and lower apertures which extend forwardly therethrough, upper and lower elongated bolts extending through the upper and lower apertures of the tooth and shank, an upright elongated plate abutting the rearward face of said shank with its upper end diverging gradually away from said rearward face of said shank, said plate having an upper aperture in alignment with said upper aperture of the tooth and shank and adapted to receive the upper elongated bolt, said plate having an elongated slot extending upward from the lowermost edge of the plate, the lower bolt having a pair of opposed grooves, the edges of said plate slot being adapted to be slidably received with said opposed grooves of the lower bolt, a head at one end of the upper bolt, and a nut threaded to the other end of the upper bolt, whereby the nut may tighten the plate and tooth against the shank, said upper end of said plate being adapted to pivot and flex toward the rearward face of the shank when the nut is tightened whereby the slot at the lower end of the plate will move outward with its edges engaging the lips of the grooves in the lower bolt urging the bolt outward and causing the lower end of the tooth to be tightened against the shank.

3. An apparatus for detachably mounting cultivator tool, comprising a cultivator tool, a shank having a curved back, a substantially straight resilient elongated plate, a pair of bolts extending through spaced portions of said tool and shank and plate, said plate tangentially abutting said curved back centrally between said bolts, tightening means upon one of said bolts to retain one end of the plate and tool to the shank, said plate having a slotted portion adjacent its other end for engagement with the other of said bolts, said other bolt having grooves for said engagement with said slotted portion of said plate, for retaining the other end of the tool and plate to the shank.

4. An apparatus for detachably mounting cultivator teeth comprising a curved cultivator tooth, a curved shank portion, a curved mounting plate, said curved plate having a forked lower end, a pair of spaced bolts extending through said tooth, shank, and plate, tightening means on one of said bolts to tighten the upper end of the plate to the tooth and shank, said upper end of said plate diverging away from said shank above said curved lower end of said plate before tightening said tightening means with at least the central portion of said plate engaging said shank, and said other bolt having grooves for receiving the forked lower end of the plate for tightening the lower end of the plate to the tooth and shank with the tightening of the upper end of the plate urging the upper end of the plate toward the shank, and urging the lower end portion of the plate and said other bolt outward to tighten said upper and lower ends of the plate and tool to the shank.

5. An apparatus for detachably mounting a cultivator tool comprising a ground engaging cultivator tool, a shank having a curved back, a substantially straight upright elongated plate facing said curved back, said tool and shank and plate each having a pair of spaced upper and lower apertures aligned coaxially from front to rear, a pair of upper and lower bolts passing forwardly through said upper and lower apertures of said tool and shank and plate, said plate tangentially abutting said curved back centrally between said upper and lower bolts, said plate having one of its apertures forming a forked opening portion adjacent one end, one of said bolts having opposing groove portions for receiving said forked portion of the plate for retaining one end of the plate and tool to the shank, tightening means on the other of said bolts to retain the other end of the plate and tool to the shank.

6. An apparatus for detachably mounting cultivator teeth comprising an L-shaped cultivator tooth, an L-shaped shank portion, a mounting plate with its front face facing said shank and having a curved lower end portion, said plate and shank and tooth each having a pair of upper and lower bores aligned coaxially from front to rear, a pair of spaced bolts extending through said bores of said tooth and shank and also said plate, said upper and lower bores of said shank acting to maintain said bolts in fixed axes from front to rear with respect to one another, said plate having its lower bore adjacent said curved lower end of said plate and forming a forked opening portion, tightening means upon one of the bolts to tighten the upper end of the plate and tooth to said shank, said upper end of said plate diverging away from said shank above said curved lower end of the plate before tightening said tightening means with said plate having its central portion abutting said shank, said other bolt having grooves receiving said forked members for retaining the lower end of the plate and tool to the shank, said forked portion of said plate having a substantially straight front face and having its rearward face tapered along the forked inner edges of said plate in a direction toward the lower end of the plate and toward the front face of said plate, said curved lower end portion being adapted to pivot outward when tightening said tightening means at said upper end of said plate and thereby draw said other bolt outward to draw the tooth at its lower end against the shank.

7. An apparatus for detachably mounting a cultivator tool comprising a cultivator tool, a shank, said tool being disposed along the front of said shank, said shank having a rearward face, an elongated upright resilient plate with upper and lower ends, said plate abutting said rearward face centrally between said upper and lower ends of said plate and diverging away from said shank adjacent said upper and lower ends, a pair of bolts passing from front to rear through spaced portions of said tool and shank and through said upper and lower ends of said plate in spaced relation, tightening means on one of said bolts to tighten one of said ends of said plate toward said rearward face of said shank to tighten one end of the tool to the shank, the other of said ends of said plate having an elongated slot portion receiving said other of said bolts, said other of said bolts having grooved portions for engagement with said plate in said slot portion with said tightening of said one end of the plate flexing and pivoting said plate about said central abutment causing the other end of said plate to be urged outward to urge said other bolt outward to tighten said other end of said tool to said shank.

References Cited in the file of this patent
UNITED STATES PATENTS

| | | |
|---|---|---|
| 369,167 | Darrow | Aug. 30, 1887 |
| 493,071 | Crane | Mar. 7, 1893 |
| 502,488 | Gale | Aug. 1, 1893 |
| 708,064 | McKinnon | Sept. 2, 1902 |
| 747,112 | Allen | Dec. 15, 1903 |
| 1,202,563 | Moody | Oct. 24, 1916 |
| 1,232,139 | Westbrooks | July 3, 1917 |
| 1,299,435 | Dorkins | Apr. 8, 1919 |
| 2,781,733 | Graham | Feb. 19, 1957 |

FOREIGN PATENTS

| | | |
|---|---|---|
| 81,669 | Sweden | Oct. 9, 1934 |